United States Patent [19]

Ogawa et al.

[11] Patent Number: 4,824,745
[45] Date of Patent: Apr. 25, 1989

[54] ELECTRIC CELL COMPRISING A POLYMERIC MATERIAL FILM ELECTRODE HAVING A COLLECTION INTEGRATED THEREWITH

[75] Inventors: Masao Ogawa, Kawagoe; Toyoo Harada, Sendai; Shinichi Toyosawa, Tokorozawa; Isamu Shinoda, Sendai; Takahiro Kawagoe, Tokorozawa; Hideharu Daifuku, Kodaira; Yoshitomo Masuda, Tachikawa, all of Japan

[73] Assignees: Bridgestone Corporation, Tokyo; Seiko Electronic Components Ltd., Sendai, both of Japan

[21] Appl. No.: 158,590

[22] Filed: Feb. 22, 1988

[30] Foreign Application Priority Data

Feb. 25, 1987 [JP]  Japan ............................ 62-43492
Feb. 26, 1987 [JP]  Japan ............................ 62-44987
Apr. 13, 1987 [JP]  Japan ............................ 62-91522

[51] Int. Cl.⁴ ............................................ H01M 4/60
[52] U.S. Cl. ..................................... 429/213; 429/252
[58] Field of Search ............... 429/213, 212, 191, 192, 429/218, 245, 252, 233, 218, 194

[56] References Cited

U.S. PATENT DOCUMENTS

| | | | |
|---|---|---|---|
| 4,278,745 | 7/1981 | Skarstad et al. | 429/213 |
| 4,526,708 | 7/1985 | Elsenbaumer et al. | 429/213 X |
| 4,560,633 | 12/1985 | Kobayashi et al. | 429/213 |
| 4,584,251 | 4/1986 | Hunziker | 429/213 X |
| 4,681,822 | 7/1987 | Berthier et al. | 429/213 X |
| 4,714,665 | 12/1987 | Siegel et al. | 429/192 |
| 4,717,634 | 1/1988 | Daifuku et al. | 429/213 |

Primary Examiner—Anthony Skapars
Attorney, Agent, or Firm—Oblon, Fisher, Spivak, McClelland & Maier

[57] ABSTRACT

In an electrochemical cell comprising a positive electrode, a negative electrode, and an electrolyte, a film of electroconductive polymeric material having a conductor embedded therein at approximately the mid point of the film is used as an electrode active material and a collector associated therewith.

11 Claims, 1 Drawing Sheet

ELECTRIC CELL COMPRISING A POLYMERIC MATERIAL FILM ELECTRODE HAVING A COLLECTION INTEGRATED THEREWITH

FIELD OF THE INVENTION

This invention relates to electrochemical cells using electroconductive polymeric material as a positive and/or negative electrode active material.

BACKGROUND OF THE INVENTION

Electroconductive polymeric materials such as polyacetylene, poly-p-phenylene, polypyrrole, polythiophene, and polyaniline are light weight and flexible a compared with metal materials. Such conductive polymeric materials are expected to make it possible to fabricate flexible electrochemical cells of lighter weight. Research effort has been focused on the use of conductive polymeric materials as the cell electrode. The conductive polymeric materials are generally prepared by either an electrolytic polymerization or a chemical process of oxidative polymerization in the presence of an oxidizing agent such as iron chloride. Those materials prepared by electrolytic polymerizaton are known to show superior performance as electrode material compared to those materials prepared by chemical oxidative polymerization because the former is available as a film having a high conductivity. In particular, polymers of aniline and its derivatives are preferred electrode materials. Among others, polyaniline is of greatest interest because it has a remarkably high charge/discharge capacity and is thus most practical as cell electrode material.

A typical prior art process for fabricating an electrochemical cell using a conductive polymeric material like polyaniline as an electrode active material includes the following steps. First, a conductive polymeric material is synthesized and deposited on an electrode as a film by electrolytic polymerization. The film of polymeric material is separated from the polymerization electrode and attached to a collector to form a cell electrode, which is used to assemble a cell. The steps of separating a conductive polymeric film from a polymerization electrode at the end of electrolytic polymerization, attaching the film to a collector to form an electrode unit, and placing the unit in a container are so cumbersome that the overall cell assembly process is complicated and time consuming. When separated film is again joined to the collector, the resulting film-collector assembly has an increased internal resistance due to an increase of resistance at the interface. A cell structure resulting from these steps imposes some limitation on the size of a cell although more compact, thin cells are currently demanded.

The collector is generally interposed between an exterior container and an electrode active material in a cell. An electrode is formed by placing the active material on one surface of the collector as a layer. In general, however, the collector which is formed of metal and carbon materials and the active material which is a conductive polymeric material have different physical properties. Because of this difference, there is the likelihood that the electrode would warp during drying or upon impregnation with electrolyte to render it difficult to assemble a cell, or the collector and the active material would separate from one another to further increase the interfacial resistance.

A secondary cell wherein a composite unit of a collector having a conductive organic polymeric material integrated on one surface thereof is placed in an exterior shell as an electrode has another problem The polymeric material expands by taking in anions or cations from the electrolyte during charging, and contracts by releasing anions or cations during discharging. In other words, the polymeric material undergoes a volume change due to electrochemical doping and de-doping during charging and discharging processes. The secondary cell having such a conductive organic polymeric material as an electrode active material maintains good electrical connection in a charging state because the expansion of the polymeric material forces the collector in firm contact with the exterior shell. As discharge proceeds, the polymeric material contracts to loosen the mechanical contact between the collector and the exterior shell to aggravate the electrical connection between the collector and the exterior shell, drastically increasing the internal resistance of the cell. This phenomenon is frequently observed particularly in coin- and button-type cells.

SUMMARY OF THE INVENTION

An object of the present invention is to provide an electrochemical cell having a low internal resistance and a high energy density.

Another object of the present invention is to provide an electrochemical cell which can be efficiently assembled through simple steps.

A further object of the present invention is to provide a secondary cell meeting the above requirements.

According to the present invention, there is provided an electric cell comprising a positive electrode comprising a positive electrode active material, a negative electrode comprising a negative electrode material, at least one of the active materials being comprised of an electroconductive polymeric material film, a current collector in the form of a conductor embedded at approximately the mid point of the film, and an electrolyte disposed between the electrodes.

The term polymeric material is used herein as equal to high molecular weight material.

BRIEF DESCRIPTION OF THE DRAWINGS

These and other objects, features, and advantages of the present invention will be better understood by reading the following description taken in conjunction with the accompanying drawings, in which.

DETAILED DESCRIPTION OF THE INVENTION

Figure 1:
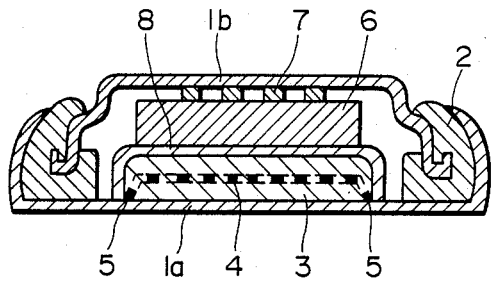
FIG. 1 is a schematic cross section of a secondary cell according to one embodiment of the present invention.

On fabricating a cell using a film of electroconductive polymeric material as a positive and/or negative electrode active material, we have discovered that an electrode which is prepared by incorporating a collector in a conductive polymeric film wherein the collector is embedded at approximately the mid point of the film and preferably at a level between 3/10 and 7/10 of its thickness, instead of placing a conductive polymeric film on one surface of a collector, experiences little warpage so that the cell assembly operation becomes more efficient and easy, and undergoes no separation of the film from the collector so that the cell has a minimum internal resistance and a high energy density.

The electrode structure wherein the collector is embedded in the conductive polymeric film at the position described above is also advantageous in preparing an electrode per se. The prior art process of preparing an electrode by first depositing a conductive polymeric film on a polymerization electrode by electrolytic polymerization, separating the film from the electrode, and attaching the film to a collector has the above-mentioned problems. To solve the problems, it is contemplated to use the polymerization electrode for electrolytic polymerization as a collector for a cell. Then the polymerization electrode and the conductive polymeric film formed thereon can be respectively used as a collector and active material without peeling the film from the electrode. In the electrolytic process of the prior art, it is necessary to mask the electrode structure onto which the conductive polymer film is deposited to prevent the electrode from being encapsulated in polymer. This masking complicates the polymerization process and, in particular, when the electrode is mesh material, masking is very difficult. The present invention allows one to omit the masking thereby simplifying the polymerization process. The product of synthesis can be used as the electrode without further processing, rendering it easy to assemble a cell. As a result, a thin compact cell can be fabricated in an efficient easy manner.

The present invention encompasses the following three preferred embodiments of cell.

(1) A positive electrode is constructed by using a conductive polymeric film and a conductor embedded therein as its active material and collector, respectively, while a negative electrode is constructed by using as its active material a material other than organic polymeric materials such as lithium and lithium alloy or a conductive polymeric material film having no conductor embedded therein and attaching the active material to a collector.

(2) A negative electrode is constructed by using a conductive polymeric film and a conductor embedded therein as its active material and collector, respectively, while a positive electrode is constructed by using as its active material a material other than organic polymeric materials such as manganese dioxide or a conductive polymeric material film having no conductor embedded therein and attaching the active material to a collector.

(3) Each of positive and negative electrodes is constructed by using a conductive polymeric film and a conductor embedded therein as its active material and collector, respectively.

Most practical among these cells is an embodiment wherein a positive electrode is constructed by using a conductive polymeric film and a conductor embedded therein as its active material and collector, respectively, while a negative electrode is constructed by using lithium or lithium alloy as its active material and attaching the active material to a collector.

The electrochemical cell of the present invention uses a film of electroconductive polymeric material as an active material for at least one of positive and negative electrodes. The preferred conductive polymeric materials are those which can be deposited as a film by electrolytic polymerization. Examples of the conductive polymeric material include products resulting from electrolytic polymerization of thiophene, pyrrole, aniline or derivatives thereof, with the products resulting from electrolytic polymerization of aniline or derivatives thereof being particularly preferred.

The derivatives of aniline are those having the formula:

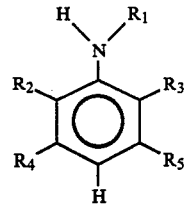

or

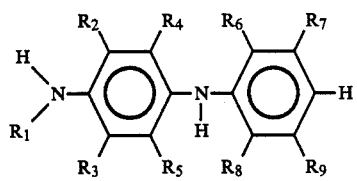

where $R_1$ through $R_9$ are independently selected from the group consisting of a hydrogen atom, an aryl radical, an alkyl radical, $NO_2$, $NH_2$, $CF_3$, $SO_2$, $CN$, $OCH_3$, $Cl$, $F$,

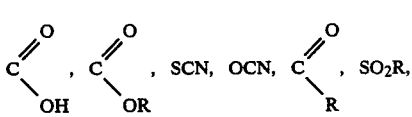

$SR$ wherein $R$ is an aryl or alkyl radical. $R_1$ through $R_9$ may be the same or different. Preferred alkyl radicals are those having 1 to 8 carbon atoms. Preferred aryl radicals are those containing a phenyl radical.

The solutions used in electrolytic polymerization are acidic solutions having dissolved therein aniline or another appropriate monomer. Examples of the acidic solution are solutions of hydrochloric acid, sulfuric acid, nitric acid, phosphoric acid, perchloric acid, and borofluoric acid, with the perchloric acid and borofluoric acid being preferred.

Particularly when aniline or a derivative thereof is electrolytically polymerized, it is preferred to use an electrolytic polymerization solution containing about 0.01 to about 5 mol/liter, more preferably about 0.5 to about 3 mol/liter of aniline or its derivative and about 0.02 to about 10 mole/liter, more preferably about 1 to about 6 mol/liter of an acid, and effect electrolysis at a temperature of about 0 to about 30° C.

The cell of the present invention uses a conductive polymeric material having a conductor embedded therein as a positive and/or negative electrode whereby the conductor serves as a current collector. The conductor may be of stainless steel, titanium, carbon, or a composite material having a surface layer of stainless steel, titanium or carbon. Preferred is stainless steel, with those stainless steel species containing up to 10% by weight of nickel, more preferably up to 5% by weight of nickel being most preferred. When stainless steel species having such a composition are combined with conductive polymeric material, the resulting composite structure is highly resistant to corrosion and free of pitting corrosion and can thus take advantage of conductive polymeric material, ensuring the manufacture of a cell having improved performance including an extended cycle life.

More preferably, the stainless steel species defined above contain about 10 to about 45% by weight, most preferably about 15 to about 35% by weight of chromium, and up to about 10% by weight, most preferably up to about 3% by weight of molybdenum. The total amount of trace elements including C, Si, Mn P and S is preferably up to 5% by weight, more preferably up to 3% by weight.

Illustrative examples of the stainless steel include austenite stainless steels such as SUS 201, SUS 202, SUS 301, SUS 302, SUS 303, SUS 304, austenite-ferrite stainless steels such as SUS 329, ferrite stainless steels such as SUS 405, SUS 410, SUS 429, SUS 430, SUS 434, SUS 436, SUS 444, and SUS 447, and other stainless steels such as SUS 403, SUS 410, SUS 416, SUS 420, SUS 429, SUS 431, and SUS 440, with the ferrite stainless steels such as SUS 430, SUS 444, and SUS 447 being most preferred.

The conductor is preferably of a mesh form because it can be closely integrated with conductive polymeric material. The mesh form used herein includes a metal net or screen, metal mesh, punched metal, foamed metal, and expanded metal.

The electrode in the form of a composite structure having a conductor embedded in a conductive polymeric film may be prepared by various methods. Preferably, a conductor as defined above is used as a polymerization electrode, and a conductive polymeric material is deposited on both the surfaces of the conductor or electrode as a film to form a composite structure, which is ready for use as a positive or negative electrode for a cell. This process is recommended because synthesis of a conductive polymeric film and fabrication of a cell electrode are easy.

In preparing an electrode in the form of a composite structure having a conductor embedded in a conductive polymeric film, it is critical that the conductor is located in the film at a level between 3/10 and 7/10 in a thickness direction. Most often, the conductor extends generally parallel to the surface of the film and is approximately coextensive with the film. The location of the conductor in the film at a specific thickness level facilitates preparation of a cell electrode by electrolytic polymerization, prevents any warpage of the electrode when the film is dry or impregnated with cell electrolyte solution, and makes it easy to assembly a cell, enabling production of cells on a continuous assembly line.

In the event that a conductor is located outside the specific level, that is, a conductor is embedded adjacent only one or the other surface of a conductive polymeric film, or a conductor is placed on a conductive polymeric film, the conductor-film unit would markedly warp or deform when the film is dry or impregnated with electrolyte solution. Warpage of the electrode renders cell assembly operation too inefficient to achieve the objects of the present invention.

The conductive polymeric film having a conductor properly embedded therein is used as a positive and/or negative electrode wherein the film serves as an active material and the conductor serves as a collector.

Preferably, the composite structure having a conductor extended within a conductive polymeric film is used as a positive electrode for a cell. When a conductive polymeric film having a conductor embedded at a specific level forms a positive electrode of a cell, the negative electrode is preferably comprised of an active material capable of capturing cations in a charging or reducing state, but releasing cations in a discharging or oxidizing state. Materials having a high degree of conjugated bond in their molecule are useful, for example, conductive polymeric materials similar to the positive electrode active material, including polyacetylene, polymers of benzene and derivatives thereof, such as poly-para-phenylene, polybenzene, and polyaniline, polypyridine, polythiophene, polyfuran, polypyrrole, and polynuclear aromatic compounds such as anthracene and naphthalene and polymers thereof. Graphite is another preferred active material. Also useful are metals capable of converting to mono- or divalent cations, for example, lithium, sodium, potassium, magnesium, calcium, barium, zinc, and alloys containing such an element, for example, lithium-aluminum alloys.

When the negative electrode active material is formed by a conductive polymeric film, the negative electrode collector is preferably embedded in the film at a thickness level as defined above.

Among the above-mentioned active materials for negative electrode, lithium and lithium alloys are most preferred. The type of lithium alloy is not critical. Alloys of lithium with one or more elements of aluminum, magnesium, indium, mercury, zinc, cadmium, lead, bismuth, tin, and antimony may be used although lithium-aluminum alloys are preferred because of their properties as a negative electrode and moldability. In case a secondary cell has a polyaniline or its derivative as a positive electrode active material, a negative electrode active material having a lithium concentration in the range of from $4 \times 10^{-3}$ to $170 \times 10^{-3}$ mol per gram of the polyaniline, positive electrode active material is effective for electrochemical occlusion and release during charging and discharging of the cell.

Where a composite structure of a conductive polymeric film having a collector embedded therein is uses as a negative electrode, a conductive polymeric material as described above my be used as a positive electrode active material. The positive electrode collector may be a conductor embedded in the conductive polymeric material as defined above. Other positive electrode active materials used herein are metal oxides such as $TiO_2$, $Cr_2O_3$, $V_2O_5$, $V_6O_{13}$, $MnO_2$, $CuO$, $MoO_3$, and $Cu_5V_2O_{10}$, metal sulfides such as $TiS_2$, $FeS$, $CuCoS_4$, and $MoS_3$, metal selenides such as $NbSe_3$, and $VSe_2$.

An electric cell is fabricated using a conductive polymeric film having a conductor or collector embedded therein as defined above. Preferably, a peripheral portion of the collector is fixedly connected to a cell container as by welding, ensuring that a cell having a minimal internal resistance is produced. Referring to FIG. 1, there is illustrated in cross section a cell according to one embodiment of the present invention. The cell has an integrated container including positive and negative terminal-forming containers 1a and 1b unified through a gasket 2. The cell contains a positive electrode active material 3 which is in contact with the positive container 1a and which is a conductive polymeric material film in the illustrated embodiment. A positive electrode collector 4 is embedded in the conductive polymeric film 3. In the illustrated embodiment, the film and the collector are of circular shape in a plan view and have a thickness in the elevational view of the figure. A peripheral portion of the collector 4 which is extended beyond the film 3 is secured at 5 to the positive container 1a by welding or brazing. A negative electrode active material 6 is in contact with a negative electrode collector 7 which in turn is in contact with the negative container 1b. A separator 8 impregnated with electrolyte is placed between the positive and negative electrode active materials 3 and 6.

A composite structure prepared by depositing a conductive polymeric film in either surface of a polymerization electrode by electrolytic polymerization is used as a cell electrode without substantial modification, that is, by removing the conductive polymeric material on a peripheral portion of the polymerization electrode to expose the peripheral portion, placing the unit in a cell container, and securing the exposed peripheral portion of the electrode serving as a collector to the container wall.

The method of securing the positive collector to the positive container is not particularly limited as long as an ohmic connection is maintained between the collector and the container even when the conductive polymeric material changes its volume during charging and discharging, particularly when the material contracts during discharging. The useful securing methods includes bonding the collector to the container with a conductive adhesive having metal powder dispersed therein, soldering the collector to the container, and welding the collector to the container. A particularly firm bond is achieved by welding the collector to the container. Spot welding, laser welding and TIG pulse welding techniques are preferably applied in the fabricating of compact cells such as coin and button-type cells because these techniques are capable of precision micro-processing.

A cell of better performance is obtained by securing and integrating the positive collector to the positive container in a state wherein the conductive polymeric material has not expanded by taking in anions or cations, that is, before charging or in a discharged state.

The possible insufficient electrical connection between a positive electrode active material and a positive terminal-forming container can be eliminated by securing the positive collector to the positive container. A stable electrical connection is maintained therebetween for an extended period of time. Poor contact is substantially eliminated and abrupt increases in internal resistance are avoided. There is obtained a secondary cell having an extended cycle life.

Lithium and lithium alloy are preferred negative electrode active materials as described above. The possible insufficient electrical connection between a negative electrode and a negative electrode container can be eliminated by securing the negative electrode 6 of lithium or lithium alloy to the negative terminal-forming container 1b through the negative electrode collector 7 as shown in FIG. 1. A stable electrical connection is maintained therebetween for an extended period of time. Poor contact is substantially eliminated and abrupt increases in internal resistance are avoided. There is obtained a secondary cell having an extended cycle life.

If a negative electrode of lithium or lithium alloy is directly secured to a negative container by spot welding, for example, the negative electrode has a reduced strength at the site of welding, leaving the possibility of reducing the cell life in that the negative electrode would separate from the negative container as the number of charge/discharge cycles increases. Instead of securing the negative electrode to the negative container through the collector, it may be conceived to place a collector in the form of a mesh or spring-shaped structural member between the negative electrode and the negative container. However, the negative electrode active material of lithium or lithium alloy is brittle so that the negative electrode may be chipped away during manufacture of a cell. Poor electrical contact can occur between the negative electrode and the negative container to increase the internal resistance due to a volume change of the negative electrode during service. Particularly, a secondary cell has the likelihood that the internal resistance increases with increasing charge/discharge cycles, thereby deteriorating charge/discharge performance to eventually render charge/discharge operation impossible. These problems are avoided by securing the negative electrode of lithium or lithium alloy to a negative container through a collector.

The collector may be formed from any desired material. Stainless steel, nickel, aluminum, platinum, and carbonaceous conductive material of a suitable shape may be used although the stainless steel is preferred. The species of stainless steel is not particularly limited and includes austenite and martensite stainless steels. Austenite stainless steels are particularly preferred because of processability and corrosion resistance, with preferred examples including SUS 304 and SUS 316. Since a cell having a negative electrode of lithium or lithium alloy has a high potential and a high energy density with a less self-discharge, the stainless steel is preferably as thin as possible, most often, about 5 to about 100 $\mu$m. A stainless steel collector of less than 5 $\mu$m thick is often too weak to provide a sufficient bond between the negative electrode and the negative container whereas a collector of more than 100 $\mu$m thick occupies a considerable space to reduce the percent effective utilization of the interior space of the cell to such an extent as to fail the requirement of a high density energy cell. The shape of stainless steel collector is not particularly limited although mesh forms including net metal, expanded metal and punched metal are preferred. Mesh stainless steel is flexible and light-weight and has the advantages that it can be readily secured to the negative electrode and the negative container and a cell with a lighter weight can be obtained.

The negative electrode of lithium or lithium alloy may be secured to a negative container through a collector by any desired techniques including adhesive bonding, welding and soldering between the negative electrode and the collector and between the collector and the container. Welding techniques are preferred among others. Spot welding, laser welding and TIG pulse welding techniques are most preferably applied in the fabricating of compact cells such as coin and button-type cells because these techniques are capable of precision micro-processing.

Since lithium alloy is brittle, a negative electrode of lithium alloy is likely to be chipped away upon bonding. To avoid such inconvenience, it is possible to securing a metal capable of forming an alloy with lithium, such as aluminum, to a negative container through a negative collector of stainless steel and to convert the metal into a lithium alloy by an electrochemical process.

In the cell shown in FIG. 1, the positive container 1a is preferably of stainless steel, more preferably of the same type of stainless steel as the previously described conductor while the negative container 1b is preferably of stainless steel, more preferably of the same type of stainless steel as the above-described negative collector.

Where a conductive polymeric film having a conductor embedded therein is used as a negative active material with the conductor serving as a negative collector, the negative collector may be secured to a negative container in the same manner as previously described in connection with the positive collector.

The electrolyte used in the cell of the present invention is a compound having an anion combined with a cation. Some illustrative, non-limiting examples of the anion include anions of Group Va element halides such as $PF_6^-$, $SbF_6^-$, $AsF_6^-$, and $SbCl_6^-$, anions of Grouop IIIa element halides such as $BF_4^-$, and $AlCl_4^-$, halides anions such as $I^-(I_3^-)$, $Br^-$, and $Cl^-$, perchlorate anions such as $ClO_4^-$, and $HF_2^-$, $CF_3SO_3^-$, $SCN^-$, $SO_4^{--}$, $HSO_4^-$, etc. Some illustrative, non-limiting examples of the cation include alkali metal ions such as $Li^+$, $Na^+$, and $K^+$, and quaternary ammonium ions such as $R_4N^+$ wherein R is hydrogen or a hydrocarbon residue.

Illustrative examples of compounds having such anions and cations include $LiPF_6$, $LiSbF_6$, $LiAsF_6$, $LiClO_4$, $LiI$, $LiBr$, $LiCl$, $NaPF_6$, $NaSbF_6$, $NaAsF_6$, $NaClO_4$, $NaI$, $KPF_6$, $KSbF_6$, $KAsF_6$, $KClO_4$, $LiBF_4$, $LiAlCl_4$, $LiHF_2$, $LiSCN$, $KSCN$, $LiSO_3CF_3$, (n-$C_4H_7)_4NAsF_6$, (n-$C_4H_7)_4NPF_6$, (n-$C_4H_7)_4NClO_4$, (n-$C_4H_7(C_2H_5)_4NClO_4$, (n-$C_4H_7)_4NI$. Preferred among them are one or more lithium salts selected from $LiClO_4$, $LiBF_4$, $LiPF_6$, $LiI$, $LiBr$, and $LiCl$. The electrolyte used herein is not limited to these compounds.

The electrolytes are generally used as solutions thereof disssolved in solvents. The type of solvent is not particularly limited although preferred are relatively highly polar solvents. Examples of the solvents include ethylene carbonate, propylene carbonate, benzonitrile, acetonitrile, tetrahydrofuran, 2-methyltetrahydrofuran, γ-butyrolactone, triethylphosphate, triethyl phosphite, dioxolane, dimethyl sulfate, dimethylformamide, dimethylacetamide, dimethylsulfoxide, dioxane, dimethoxyethane, polyethylene glycol, sulfolane, dichloroethane, chlorobenzene, nitrobenzene, and water alone or mixtures of two or more of them. Non-aqueous solvents are preferred among them because they can provide cells with a higher electromotive force.

Other examples of the electrolyte which constitutes the secondary cell of the present invention include solid organic electrolytes, for example, polymers impregnated with the above-mentioned electrolyte compounds, including polyethylene oxide, polypropylene oxide, isocyanate cross-linked polyethylene oxide, and phosphazene polymer having an ethylene oxide oligomer side chain, and solid inorganic electrolytes, for example, inorganic ion conductors such as $Li_3N$ and $LiBCl_4$, and lithium glass such as $Li_4SiO_4$—$Li_3BO_3$.

The cell of the present invention is constructed by interposing the electrolyte between the positive and negative electrodes. A separator may be disposed to partition the positive and negative electrodes. The separators may be porous films of synthetic resins such as polyethylene and polypropylene and sheets of natural fiber paper. Preferably, the separator has a laminate structure consisting of two or more layers wherein at least one layer is comprised of a microporous film of polypropylene and at least one layer is a non-woven fabric of fiber glass-containing polypropylene.

The microporous film of polypropylene is to control movement of electrolyte ions such as lithium ions. Preferred microporous films have pores with a diameter of up to 50 μm, more preferably up to 20 μm. The lower limit of the diameter may be 5 μm. Pores of such a small diameter allow for smooth deposition and dissolution of lithium on the lithium alloy and are thus effective in extending the cycle life of a cell. The microporous film preferably has a thickness in the range of from about 25 to about 100 μm although the thickness is not critical to the present invention.

The non-woven fabric of fiber glass-containing polypropylene has the ability to retain a requisite amount of electrolytic solution in a cell using a conductive polymeric material and is thus effective in improving the capacity and cycle life of the cell. The cycle life of a secondary cell is outstandingly extended by combining the fiber glass-containing polypropylene non-woven fabric with the porous polypropylene film. A non-woven fabric of fiber glass-free polypropylene often has a poor ability to retain the electrolytic solution and is mechanically weak so that it is disadvantageous in both performance and manufacture of a cell. Then the cycle life of a secondary cell is not fully extended.

The fiber glass-containing polypropylene non-woven fabric preferably has a fiber glass content of about 5 to about 60% by weight with the remainder polypropylene. A fabric containing less than 5% by weight of fiber glass is inferior in an ability to retain solution. A fabric containing more than 60% by weight of fiber glass has an ability to retain solution, but a low strength and an increased water content and is thus inappropriate in constructing a non-aqueous electrolyte cell. The fiber glass-containing polypropylene non-woven fabric preferably has a thickness of about 50 to about 200 μm.

Figure 2:
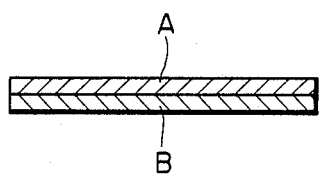
FIG. 2 and 3 are cross sections of different examples of the separator used in the cell of FIG. 1.
Figure 3:
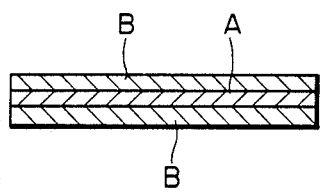

Placement of a polypropylene porous film and a fiber glass-loaded polypropylene non-woven fabric is not particularly limited. They may be placed one on another in various ways. For example, a porous film A is placed on a non-woven fabric B as shown in FIG. 2. A sandwich structure is also available wherein a porous film A is interposed between a pair of non-woven fabrics B as shown in FIG. 3.

The separator having a polypropylene porous film combined with a fiber glass-containing polypropylene non-woven fabric as described above is suitable for use in a cell having positive electrode of a conductive polymeric material and a non-aqueous electrolyte solution. A cell having a very high discharge capacity and an extended cycle life is expectable with this combination. A fully stable cycle life is not achieved with the use of a polypropylene non-woven fabric, using a polypropylene porous film or a fiber glass-containing polypropylene non-woven fabric alone or using a fiber glass fabric in combination with a polypropylene porous film. Nevertheless, a composite structure of a polypropylene porous film with a fiber glass-containing polypropylene non-woven fabric has the ability to retain even a non-aqueous electrolyte solution so that a cell having an increased capacity and an extended cycle life can be produced.

The cell of the present invention may take any desired form including cylindrical, button, coin and film types. One typical form is shown in FIG. 1. The exact structure of a cell may be suitably chosen depending on an intended use of the cell. The present invention is successful in producing a thin compact cell by employing the above-described electrode construction. A cell of the structure shown in FIG. 1 can be manufactured to a thickness of about 1 to about 5 mm.

The cell of the present invention using an electrode of a conductive polymeric film having a collector built therein can be assembled in simple steps of manufacture because the electrode has a minimal internal resistance and a high energy density and is free of warpage. Therefore small-sized, thin, light-weight cells are available. The cells of the present invention thus find a variety of applications in versatile uses including automobiles, aircrafts, portable equipment, and computers.

EXAMPLES

Examples of the present invention are presented below together with comparative examples. They are construed to be illustrative of the present invention and not limiting the present invention.

EXAMPLES 1-4, COMPARATIVE EXAMPLES 1-2

Electrolytic polymerization was carried out in a bath having an anode in the form of a mesh substrate of 4 cm×2 cm×90 μm (thick) formed of molybdenum-containing austenitic stainless steel (SUS 316), a cathode in the form of a lead plate, and an electrolytic polymerization solution in the form of an aqueous solution containing 1 mol/liter of aniline and 2 mol/liter of borofluoric acid, by conducting a constant current of 100 mA for one hour. In this way, polyaniline was electrochemically synthesized and deposited on the mesh substrate such that the mesh substrate was embedded in the resulting polyaniline film at varying levels as shown in Table 1. The polyaniline deposit was washed with water and dried, obtaining sandwich structure having 23 to 25 mg/cm$^2$ of polyaniline film formed on the mesh substrate. It was found that the polyaniline firmly adhered to the mesh substrate.

The sandwich structure of mesh substrate coated with polyaniline was cut to predetermined dimensions. The sandwich structure was an integral positive electrode assembly of active material and current collector wherein the polyaniline film formed the positive electrode active material and the mesh substrate formed the collector. Using this sandwich structure, a cell as shown in FIG. 1 having a thickness of 1.6 mm was fabricated to evaluate the warpage of the positive electrode and the efficiency of cell assembling operation. For the negative electrode, the active material used was Li-Al alloy and the collector was stainless steel (SUS 316). The electrolyte solution was propylene carbonate containing 1 mol/liter of LiBF$_4$, and the separator was non-woven fabric of polypropylene. The separator was impregnated with the electrolyte solution.

The positive electrode collector was connected to a positive terminal-forming container of stainless steel (SUS 447) by removing some polyaniline from the side of the sandwich structure to expose a peripheral portion of the mesh substrate, and welding the peripheral portion of the mesh substrate to the container. On the negative electrode side, the lithium alloy and the collector, and the collector and a negative terminal-forming container of stainless steel (SUS 304) were respectively secured by welding.

The results are shown in Table 1.

TABLE 1

| | Embedded level[1] | Electrode warpage[2] | | Operation efficiency[3] |
|---|---|---|---|---|
| | | dry | impregnated | |
| CE1 | 0/10 | +1.0 | −0.5 | very low |
| CE2 | 2/10 | +0.5 | −0.3 | low |
| E1 | 3/10 | +0.2 | −0.1 | high |
| E2 | 4/10 | +0.1 | 0 | high |
| E3 | 6/10 | +0.1 | 0 | high |
| E4 | 7/10 | +0.2 | −0.1 | high |

[1]The embedded level is the position of the collector in the polyaniline film as measured in a thickness direction from the lower surface of the film to be disposed adjacent to the positive terminal-forming container.
[2]Warpage of the positive electrode unit was determined both when it is dry and impregnated with the electrolyte, and evaluated + when it warped toward the separator and − when is warped toward the container.
[3]Operation efficiency was evaluated in terms of ease of assembling operation including welding, setting, and sealing.

As is evident from Table 1, a positive electrode unit having the collector embedded in a film of electroconductive polymeric material at a level between 3/10 and 7/10 in a thickness direction thereof undergoes little warpage both in dry and impregnated states and is easy to handle, facilitating the overall operation of cell assembly.

For the positive electrode unit of Comparative Example 1, polyaniline film formation should be carried out by masking one major surface of a mesh substrate and depositing a polyaniline film only on the other surface of the substrate. For the units of the present examples, a polyaniline film can be synthesized in a simple manner without the need for masking.

EXAMPLE 5

Electrolytic oxidative polymerization was carried out in a bath having an anode in the form of mesh stainless steel having the composition shown in below, a cathode in the form of a platinum plate, and an aqueous solution containing 1 mol/liter of aniline and 2 mol/liter of HBF$_4$ as an electrolytic solution at a temperature of 15° C. by applying a constant current at an anodic current density of 6 mA/cm$^2$ for 2½ hours. There was obtained a composite structure having the mesh embedded in the polyaniline film at a level of 6/10 of its thickness.

Stainless steel composition

| Ingredient | % by weight |
|---|---|
| C | ≦0.12 |
| Si | ≦0.75 |
| Mn | ≦1.00 |
| P | ≦0.040 |
| S | ≦0.030 |
| Ni | ~0 |
| Cr | 17.00 |
| Mo | ~0 |
| Fe | balance |

The composite structure was washed with distilled water and dried to thoroughly remove water. The composite structure was an integral positive electrode assembly of active material and collector wherein the polyaniline film formed the positive electrode active material and the anode substrate formed the collector. Using this composite structure, a secondary cell as shown in FIG. 1 was fabricated in the same manner as in Examples 1-4. For the negative electrode, the active material used was Li-Al alloy and the collector was stainless steel (SUS 316). The electrolyte was a non-aqueous solution containing 1 mol/liter of LiBF$_4$ in a mixture of propylene carbonate and dimethoxyethane.

A cycle life test was conducted on the cell by repeatedly charging and discharging the cell at a constant temperature of 60° C. The charge/discharge cycle consisted of charging at a constant current of 0.6 mA/cm² until the cell voltage reached 3.3 volts and discharging at a constant current of 0.6 mA/cm² until the cell voltage reached 2.0 volts. This charge/discharge cycle was repeated until the discharge capacity of the cell decreased to 50% or less of the initial capacity. The number of cycles at this point of time is designated as the cycle life of the cell.

The cell showed a cycle life of 121 cycles in the test, indicating that the composite structure of polyaniline film having mesh stainless steel of the above composition integrated therein has excellent characteristics as cell electrode.

EXAMPLE 6

Electrolytic oxidative polymerization of aniline was carried out by the same procedure as in Example 5 except that the anode was mesh stainless steel having the following composition. There was obtained a composite structure having the mesh embedded in the polyaniline film at a level of 6/10 of its thickness.

Stainless steel composition

| Ingredient | % by weight |
|---|---|
| C | ≦0.08 |
| Si | ≦1.00 |
| Mn | ≦2.00 |
| P | ≦0.045 |
| S | ≦0.030 |
| Ni | 9.30 |
| Cr | 19.50 |
| Mo | ~0 |
| Fe | balance |

A cell having the same organization as in Example 5 was fabricated using the composite structure substantially as obtained. That is, the polyaniline film and the anode embedded therein were used as the active material and collector of the positive electrode. The cell was measured to have a cycle life of 103 cycles, indicating that the composite structure of polyaniline film having mesh stainless steel of the above composition integrated therein satisfactorily performs as cell electrode.

EXAMPLE 7

Electrolytic oxidative polymerization of aniline was carried out by the same procedure as in Example 5 except that the anode was mesh stainless steel having the following composition. There was obtained a composite structure having the mesh embedded in the polyaniline film at a level of 6/10 of its thickness.

Stainless steel composition

| Ingredient | % by weight |
|---|---|
| C | ≦0.015 |
| Si | ≦0.50 |
| Mn | ≦0.50 |
| P | ≦0.04 |
| S | ≦0.03 |
| Ni | ~0 |
| Cr | 19.00 |

A cell having the same organization as in Example 5 was fabricated using the composite structure substantially as obtained. That is, the polyaniline film and the anode embedded therein were used as the active material and collector of the positive electrode. The cell was measured to have a cycle life of 125 cycles, indicating that the composite structure of polyaniline film having mesh stainless steel of the above composition integrated therein satisfactorily performs as cell electrode material.

EXAMPLE 8

Electrolytic oxidative polymerization of aniline was carried out by the same procedure as in Example 5 except that the anode was mesh stainless steel having the following composition. There was obtained a composite structure having the mesh embedded in the polyaniline film at a level of 6/10 of its thickness.

Stainless steel composition

| Ingredient | % by weight |
|---|---|
| C | ≦0.03 |
| Si | ≦0.15 |
| Mn | ≦0.04 |
| P | ≦0.015 |
| S | ≦0.015 |
| Ni | 0.18 |
| Cr | 30.0 |
| Mo | 2.0 |
| Fe | balance |

A cell having the same organization as in Example 5 was fabricated using the composite structure substantially as obtained. That is, the polyaniline film and the anode embedded therein were used as the active material and collector of the positive electrode. The cell was measured to have a cycle life of 134 cycles, indicating that the composite structure of polyaniline film having mesh stainless steel of the above composition integrated therein satisfactorily performs as cell electrode.

EXAMPLE 9

There was prepared a composite structure having the mesh stainless steel of the composition shown in Example 6 embedded in a polyaniline film at a level of 6/10 of its thickness. A coin type secondary cell as shown in FIG. 1 was fabricated in a humidity-controlled glove box by using the polyaniline film (4.0 mg) and the anode as the active material and collector of the positive electrode. For the negative electrode, the active material used was Li-Al alloy and the collector was stainless steel. The electrolyte used was a solution containing 3 mol/liter of LiBF₄ in a mixture of equal volumes of propylene carbonate and dimethoxyethane. The separator was a two-layer laminate of a polypropylene porous film of 50 μm thick having pores of 20 μm in diameter and a polypropylene nonwoven fabric of 120 μm thick containing 40% by weight of glass fibers.

The cell was examined for cycle performance by repeatedly charging at a current of 1 mA for one hour followed by discharging at a current of 1 mA for one hour. The results are shown in Table 2. The figures reported in Table 2 are the cycles for three cells and an average thereof.

TABLE 2

| Cycles | | | | |
|---|---|---|---|---|
| Cell 1 | Cell 2 | Cell 3 | Average | Remarks |
| 1650 | 1580 | 1710 | 1647 | excellent performance |

As is evident from Table 2, a secondary cell having an improved cycle life is obtained by using a separator comprising a polypropylene porous film combined with a glass fiber-filled polypropylene nonwoven fabric.

Obviously, numerous modifications and variations of the present invention are possible in light of the above teachings. It is therefore to be understood that within the scope of the appended claims, the invention may be practiced otherwise than as specifically described herein.

We claim:

1. An electric cell comprising
a positive electrode comprising a positive electrode active material,
a negative electrode comprising a negative electrode active material, at least one of the active materials being comprised of an electroconductive polymeric material film,
a current collector in the form of a conductor embedded in said film at a level between 3/10 and 7/10 of the thickness of said film, and
an electrolyte disposed between the electrodes.

2. The cell of claim 1 wherein a product prepared by depositing an electroconductive polymeric material on two opposed major surfaces of an electrode by electrolytic polymerization is used to form the active material and the collector.

3. The cell of claim 1 wherein the electroconductive polymeric material comprises a material obtained by electrolytic polymerization of aniline or a derivative thereof.

4. The cell of claim 1 wherein the conductor is selected from the group consisting of stainless steel, titanium, carbon, and a composite material having a surface layer of stainless steel, titanium or carbon.

5. The cell of claim 1 wherein the conductor is a mesh stainless steel containing up to 10% by weight of nickel.

6. The cell of claim 1 wherein
the positive electrode comprises a positive electrode active material in the form of an electroconductive polymeric material film and a positive collector in the form of a conductor embedded in the film, and
a negative electrode comprises a negative electrode active material in the form of lithium or a lithium alloy and a negative collector fixedly secured thereto.

7. The cell of claim 6 wherein the conductor has a peripheral portion extended beyond the film, the exposed peripheral portion of the conductor is fixedly connected to a positive container, and the negative collector is fixedly secured to a negative container.

8. The cell of claim 1 which further comprises a separator isolating the positive electrode from the negative electrode.

9. The cell of claim 8 wherein said separator is comprised of a porous film of polypropylene and a nonwoven fabric of glass fiber-filled polypropylene placed one on the other.

10. The cell of claim 9 wherein the glass fiber-filled polypropylene contains 5 to 60% by weight of glass fibers.

11. An electric cell comprising a positive electrode comprising an electroconductive polymeric film as the positive electrode;
a positive collector in the form of a conductor embeded in said film at a level of between 3/10 and 7/10 of the thickness of said film;
a negative electrode comprising a lithium or lithium alloy; and
an electrolyte disposed between said electrodes.

* * * * *